H. I. DETRO.
DEVICE FOR SUPPLYING WATER TO STORAGE BATTERIES.
APPLICATION FILED OCT. 13, 1917.
1,266,425.
Patented May 14, 1918.
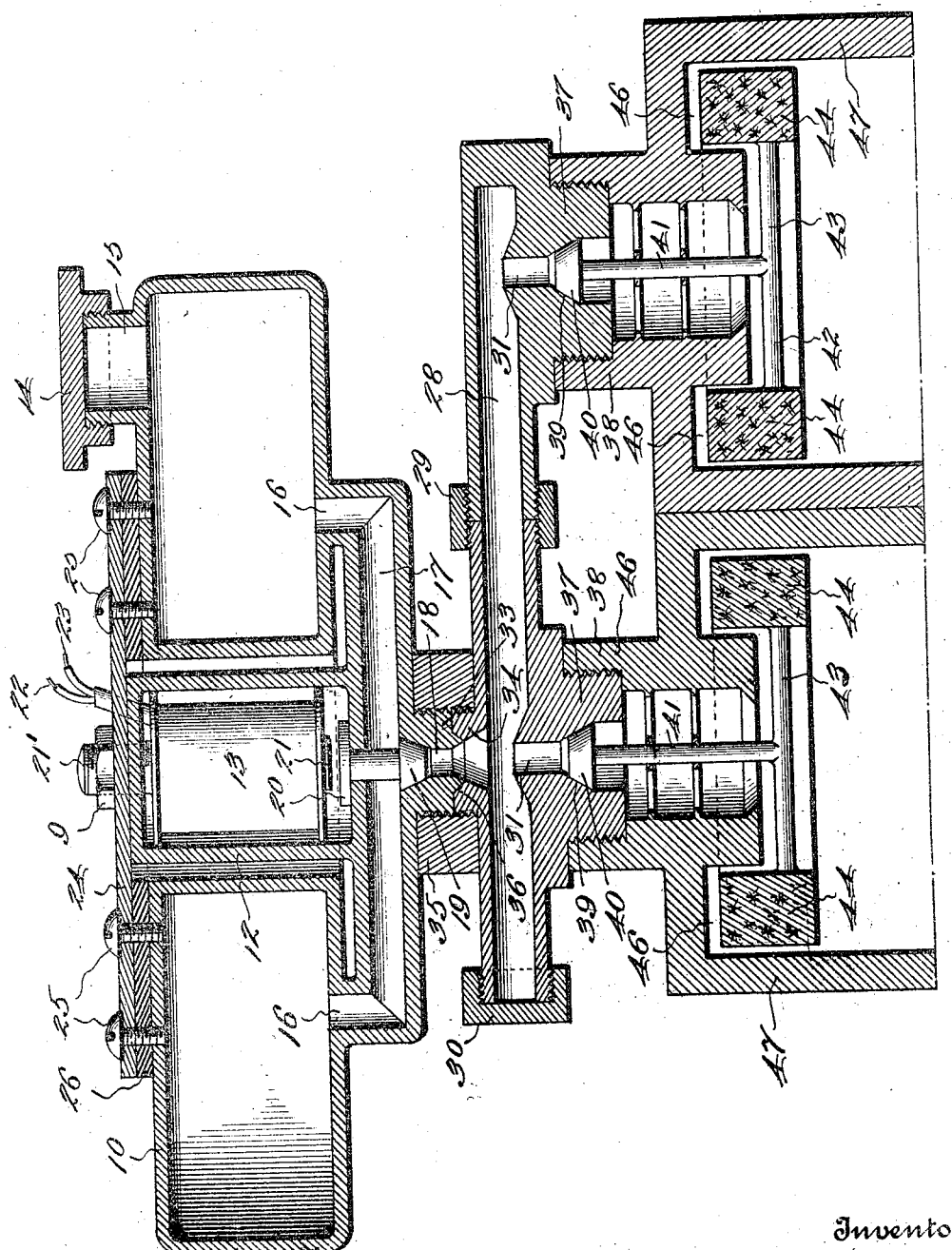

UNITED STATES PATENT OFFICE.

HOWARD I. DETRO, OF INTERLAKEN, NEW YORK.

DEVICE FOR SUPPLYING WATER TO STORAGE BATTERIES.

1,266,425. Specification of Letters Patent. Patented May 14, 1918.

Application filed October 13, 1917. Serial No. 196,493.

*To all whom it may concern:*

Be it known that I, HOWARD I. DETRO, a citizen of the United States, residing at Interlaken, in the county of Seneca and State of New York, have invented new and useful Improvements in Devices for Supplying Water to Storage Batteries, of which the following is a specification.

This invention relates to a device for supplying water to a storage battery, and it is designed for use especially in connection with a battery carried by an automobile, the device being operated by means of an electromagnet controlled by a push button on the dash board of the car, or located in any suitable position in the event that the battery is used for purposes other than that above indicated.

One of the objects is to provide in connection with a reservoir for containing distilled water, a valve controlled by an electromagnet and adapted to discharge water into a duct having communication with each of the cells of the battery, and means automatically controlled for cutting off the supply of water to each cell when the latter has been filled to the required degree.

A further object is to provide in connection with a reservoir for containing water and a valve controlling a common outlet leading from a plurality of ducts extending from said reservoir and a' duct having communication with each of the cells of the battery, a float valve within each cell for closing the inlet thereof when the cell has been filled to the required degree.

With the foregoing and other objects in view, the invention consists in the novel construction, combination and arrangement of elements hereinafter described and claimed.

The invention is illustrated in the accompanying drawing wherein is shown a vertical central section of a storage battery embodying my invention. Referring now to the drawing and the reference numerals thereon, the reservoir 10 is provided with an interior chamber 11 inclosing a casing 12 for the accommodation of an electromagnet 13 designed to operate the valve controlling the discharge of water from the reservoir. A cap 14 closes inlet opening 15, and a plurality of discharge openings 16 lead from the bottom of the reservoir and communicate with a duct 17 having a common outlet 18 providing a seat for the valve member 19. This member 19 carries a disk member 20 at its upper end located immediately below the core 21 of magnet 13. The wires leading from the magnet are designated 22 and 23 and lead to the dash board where they are under the control of the push button, or other form of circuit completing device. The central chamber 11 is closed by means of a cap or plate 24 secured by screws or the like designated 25. The plate 24 is separated from the upper portion of the reservoir 10 by means of a sheet of packing 26.

The outlet 18 leading from duct 17 communicates with a duct 28 which may include a plurality of sections secured by means of a coupling 29. One end of duct 28 is closed by a cap 30.

This duct has a plurality of outlets 31, the number depending upon the number of cells in the battery.

The lower wall of the duct 17 carries a threaded boss 33 registering with another threaded boss 34 carried by the wall of duct 28, these members being connected by a threaded collar or nut 35 forming a water tight connection at 36. The lower wall of duct 28 is provided with threaded bosses 37 which may be caused to engage the threaded flanges 38 of the cells, each section of duct 28 being connected independently with its corresponding cell.

Each boss 37 is provided with a valve seat 39 with which a valve 40 coöperates, this valve having a stem 41 provided with laterally extending members 42 and 43 carrying a float or floats 44. The float may be of ring like formation or individual floats may be provided, the float or floats extending into annular recesses 46 in the upper portion of the casing of the cell or cells 47.

In the use of the device the push button or other circuit closing member on the dash board is operated for the purpose of energizing electromagnet 13 retained in position by a nut 9 secured to the core or supporting member 21'. Upon completing the circuit for the magnet the valve 19 is opened permitting water to flow from the reservoir through duct 17, port 18, duct 28 and the various openings or ports 31 to the respective cells 47, the valves 40 having been previously opened by the downward movement of the floats 44 due to the evaporation of the water in the cells. Although it is only necessary to energize the electromagnet for a short period by completing the circuit therefor, if the period is longer than is required for discharging a given quantity of water, the floats rising to the upper portion of the cells will close valves 40.

What is claimed is:—

1. In a device of the class described, a reservoir, an outlet therefor, a valve controlling the outlet, an electromagnet for operating the valve, a battery cell, and a float valve controlling the inlet of said cell, and a stem for the valve proportioned to permit the float to close the valve when said float reaches a pre-determined point, and independently of the movement of the valve first named, said inlet having connection with the outlet from the reservoir.

2. In a device of the class described, a reservoir, an outlet therefor, a valve controlling the outlet, a magnet for opening the valve, a plurality of battery cells, a duct communicating with each cell and with the reservoir outlet, a valve controlling the inlet of each cell, and means automatically controlled for operating the valve last named for cutting off communication with the cell prior to the closing of the valve first named.

3. In a device of the class described, a reservoir inclosing a centrally located chamber and provided with outlets, a magnet within said chamber, a duct communicating with the outlets of the reservoir, said duct being provided with an outlet, a valve controlling said outlet, a stem for said valve located within the field of the magnet, a duct provided with a plurality of outlets, a plurality of battery cells each communicating with one of the outlets last named, a valve controlling each outlet last named, and means located within each cell for automatically operating the valves last named.

4. In a device of the class described, a plurality of battery cells, a duct member connected with each of said cells and adapted to admit fluid thereto, means for connecting said duct members with each other, a plurality of valves controlling outlets between the duct members and the cells, a reservoir provided with a plurality of outlets, a duct member connected with said outlets, an outlet for said duct into one of the ducts first named, a valve controlling the outlet last named, and magnetic means for controlling the valve.

5. In a device of the class described, a reservoir provided with a centrally located chamber, a duct connected with said chamber at a plurality of points, a plate extending across the upper portion of the reservoir and inclosing the aforesaid chamber, a magnet within said chamber and means for mounting said magnet below the plate, a common outlet for the duct, a valve controlling said outlet, a stem for the valve located within the field of the magnet, a plurality of battery cells, a float valve controlling the inlet for each cell, a duct member connecting the inlets of the cells and means connecting said duct member with the outlet from the duct first named.

6. In a device of the class described, a reservoir comprising a hollow annular member with a central opening, an outlet for the reservoir, a valve controlling the outlet and an electro-magnet for operating the valve, said magnet being mounted within the aforesaid opening, a battery cell and a float valve controlling inlets of said cell, the inlet having connection with the outlet from the reservoir.

In testimony whereof I affix my signature.

HOWARD I. DETRO.